(12) United States Patent
Maier et al.

(10) Patent No.: US 6,830,601 B2
(45) Date of Patent: Dec. 14, 2004

(54) CARBURETOR ARRANGEMENT

(75) Inventors: Georg Maier, Kernen (DE); Martin Benholz, Oppenweiler (DE); Günter Wolf, Oppenweiler (DE); Philipp Neumann, Stuttgart (DE); Andreas Bähner, Weinstadt (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 10/642,273

(22) Filed: Aug. 18, 2003

(65) Prior Publication Data

US 2004/0031250 A1 Feb. 19, 2004

Related U.S. Application Data

(63) Continuation-in-part of application No. 10/102,899, filed on Mar. 22, 2002, now Pat. No. 6,607,574.

(30) Foreign Application Priority Data

Mar. 23, 2001 (DE) .......................................... 101 14 420

(51) Int. Cl.$^7$ ............................................. F02M 17/34
(52) U.S. Cl. ................................ 55/385.7; 55/DIG. 28; 123/280; 123/198 E; 261/1
(58) Field of Search ............................ 55/385.3, 385.7, 55/DIG. 28; 123/280, 198 E; 261/1, 112.1, DIG. 85

(56) References Cited

U.S. PATENT DOCUMENTS

| | | | |
|---|---|---|---|
| 1,323,048 A | 11/1919 | Goodwin | 123/572 |
| 1,983,866 A | 12/1934 | Mikulasek | 285/404 |
| 3,678,663 A | 7/1972 | Hansen | 96/141 |
| 3,811,417 A | 5/1974 | Keenan et al. | 55/DIG. 28 |
| 4,509,613 A * | 4/1985 | Yamaguchi | 180/219 |
| 4,600,418 A | 7/1986 | Gommel et al. | 55/462 |
| 4,834,784 A | 5/1989 | Bidanset | 55/385.7 |
| 4,838,909 A | 6/1989 | Bidanset | 55/385.7 |
| 4,946,482 A | 8/1990 | Tamba et al. | 55/320 |
| 5,918,576 A * | 7/1999 | Ohoka et al. | 123/198 E |
| 6,010,549 A * | 1/2000 | Higashi et al. | 55/385.3 |
| 6,312,488 B1 * | 11/2001 | Fischer | 55/315 |
| 6,391,073 B1 * | 5/2002 | Koga | 55/289 |
| 6,395,049 B2 * | 5/2002 | Knodler et al. | 55/385.3 |
| 6,409,783 B1 * | 6/2002 | Miyajima et al. | 55/385.3 |
| 6,454,823 B2 * | 9/2002 | Fries et al. | 55/385.3 |
| 6,491,734 B1 * | 12/2002 | Park | 55/385.3 |
| 6,578,831 B2 * | 6/2003 | Menzel et al. | 261/152 |
| 6,607,574 B2 * | 8/2003 | Maier et al. | 55/385.7 |
| 6,659,432 B2 * | 12/2003 | Nickel | 261/64.1 |

FOREIGN PATENT DOCUMENTS

| | | |
|---|---|---|
| FR | 2567199 | 1/1986 |
| GB | 14085 | 6/1914 |

* cited by examiner

Primary Examiner—Richard L. Chiesa
(74) Attorney, Agent, or Firm—Walter Ottesen

(57) ABSTRACT

The invention relates to a carburetor arrangement for an internal combustion engine (1) which drives a work apparatus. The engine (1) has an intake channel (3) leading through a carburetor (2). The intake channel (3) includes an intake opening (4) on the side of the carburetor (2) facing away from the engine (1). A baffle wall (5) is provided and covers the intake opening (4) at least partially. The baffle wall (5) is mounted transversely to the longitudinal axis (6) of the intake channel (3) at a spacing to the intake opening (4). The baffle wall (5) and the intake opening (4) define a baffle enclosure (7) disposed therebetween. At least a first component part (8) of the baffle wall (5) is inclined with respect to the longitudinal axis (6) of the intake channel (3) in such a manner that fuel droplets (9), which exit from the intake channel (3) and which impinge on the first component part (8) of the baffle wall (5), form a fuel film (10).

14 Claims, 3 Drawing Sheets

CARBURETOR ARRANGEMENT

RELATED APPLICATION

This is a continuation-in-part application of patent application Ser. No. 10/102,899 filed Mar. 22, 2002 now U.S. Pat. No. 6,607,574 and claiming priority of German patent application 101 14 420.2, filed Mar. 23, 2001.

BACKGROUND OF THE INVENTION

A carburetor is provided in internal combustion engines for driving work apparatus such as chain saws, blower/vacuum apparatus, brushcutters or the like. The carburetor has an intake channel via which combustion air is inducted. In the carburetor, an air/fuel mixture is prepared and, in two-stroke engines, is supplied to the crankcase of an internal combustion engine. The intake operation is discontinuous because the intake stroke of an engine lies only approximately in the region smaller than a half crankshaft rotation. During this time, the piston of a two-stroke engine clears an inlet window via which the air/fuel mixture flows into the crankcase. After the end of the intake operation, the piston closes the inlet window so that the intake operation is interrupted. Comparable conditions arise in a four-stroke engine because of the opening and closing of the connection between the cylinder and the intake channel by means of a valve.

A pressure wave develops reflecting at the closed inlet window because of the inertial and elasticity forces of the column of the air/fuel mixture which is accelerated in the intake direction in the intake channel. The pressure wave runs opposite to the intake direction through the intake channel. This pressure wave can run up to the intake opening of the intake channel at the air filter end especially for a fully open position of the throttle flap in the carburetor and can propagate, for example, in the interior space of an air filter housing connected ahead. Fuel droplets of the air/fuel mixture, which is formed in the carburetor, can be entrained by this pressure wave opposite to the intake direction and be transported out of the intake channel. The fuel portion, which reaches the interior space of the air filter, leads there to coking which restricts the capacity of the air filter or leads to a deposit of solid particles on the outer side of the filter material. The intake opening of the intake channel forms an open, likewise reflection capable end for the vapor column in the intake channel. The vapor column can oscillate in the intake channel and, at a specific rpm, resonance can occur which amplifies the unwanted effect of the fuel discharge.

To avoid the intake of fuel into the air filter housing, carburetor arrangements are known wherein a baffle wall is mounted at a spacing ahead of the intake opening. The baffle wall covers at least a portion of the intake opening. The pressure wave, which exits from the intake opening, is partially reflected by the baffle wall and is thrown back into the intake channel together with the entrained fuel droplets. These droplets cannot be braked without deceleration because of the relatively high specific weight of the fuel droplets compared to air whereby a portion of the fuel droplets impinges upon the baffle wall and there runs down. However, it has been shown that the impinging fuel droplets tend to burst upon impact and the resulting smaller fuel droplets are entrained by a part of the pressure wave past the baffle wall and into the interior space of the air filter housing.

SUMMARY OF THE INVENTION

It is an object of the invention to improve a known carburetor arrangement so that the entry of fuel into the air filter housing is minimized.

The carburetor arrangement of the invention is for an internal combustion engine driving a work apparatus. The carburetor arrangement includes: a carburetor; an intake channel defining a longitudinal axis and being formed in the carburetor and having an end facing away from the engine; the intake channel having an intake opening at the end; a baffle wall at least partially covering the intake opening; the baffle wall being mounted transversely to the longitudinal axis and being disposed at a distance from the intake opening; the baffle wall delimiting a baffle enclosure disposed between the baffle wall and the intake opening; the baffle enclosure having an inflow opening for combustion air and the inflow opening lying rotated by approximately 90° to the intake opening; the inflow opening having an edge lying away from the intake opening; and, a protective wall provided at the edge and the protective wall extending partially over the baffle enclosure.

For this purpose, at least a first component piece of the baffle wall or the baffle wall as a whole is inclined into the baffle enclosure or receptacle at an angle of inclination with respect to the longitudinal axis of the intake channel. To prevent fuel droplets, which burst on the baffle wall notwithstanding the selected inclination, from a partial exiting from the inflow opening, a protective wall is provided at the edge of the inflow opening which lies facing away from the intake opening. This protective wall partially engages over the baffle space. A fuel entry into the air filter housing can largely be avoided.

The protective wall extends essentially in the plane of the inflow opening. The free end section of the protective wall advantageously lies closer to the intake opening than the edge of the inclined component piece which edge lies inside the baffle space. The free end section is especially bent over in the direction toward the intake opening into the baffle enclosure.

The angle of inclination is advantageously so selected that the fuel droplets, which exit from the intake channel and are entrained by the reflected pressure wave, hardly burst upon impact and deposit as a fuel film on the baffle wall. This film of fuel can be conducted away in a defined manner from the baffle wall and again be introduced into the intake channel. In this way, a coking of the air filter is avoided and, at the same time, via the return of the fuel film from the baffle wall into the intake channel, a loss of fuel is avoided.

In an advantageous embodiment of the invention, an end wall is provided which connects the lower edge of the baffle wall to a further lower edge of the intake opening. The end wall is, relative to the direction of gravity of the work apparatus (held in the usual operating position), disposed below the baffle wall. As a consequence of the above, the film of fuel can flow off from the baffle wall to the end wall supported by gravity. At the end wall, the film of fuel is transported back into the intake channel by the intake air flow which flows by. Suitably, the above-mentioned first component part of the baffle wall is inclined with respect to the longitudinal axis in the direction toward the end wall in such a manner that the cross section of the baffle space expands from the longitudinal axis in the direction of the end wall. Because of this kind of an alignment of the inclination angle, the kinetic energy of the fuel droplets, which exit from the intake opening, operates upon impact on the baffle wall with a component in the direction of the end wall. This force component acts supportively on the fuel film in the direction of gravity so that an improvement of the conveyance of the fuel film in the direction of the end wall and from there into the intake channel is given without additional assisting means. The transition between the end wall and the baffle wall is configured so as to be rounded, whereby a defined air flow can form in the round which, in this region too, makes possible a clean conveyance of the fuel film to avoid unwanted collection locations. The end wall extends advantageously uniformly and especially as a straight line into the lower channel wall of the intake channel whereby the fuel film can be carried into the intake channel with little resistance. Furthermore, the flow resistance for the inducted air is reduced in this manner.

In an advantageous further embodiment of the invention, a further wall is provided on each side of the baffle wall and the end wall and these walls conjointly define a baffle receptacle having an inflow opening lying opposite to the end wall. With a baffle receptacle of this kind, precisely defined flow conditions are given with simple means for the intake operation as well as for the reflection operation. As a consequence thereof, the induction resistance can be adjusted to be low and the inclination of the baffle wall for film formation can be adjusted precisely in a defined manner. The above-mentioned side walls define a rounded transition to the baffle wall and also to the end wall because a portion of the fuel film also can deposit on these walls. This region of the fuel film can be removed in the rounds correspondingly well by the intake air flow. In total, a further reduction of the intake flow resistance can be achieved with the rounded configuration.

In an advantageous further embodiment, the baffle wall includes a second component part which is inclined with respect to the longitudinal axis for forming a fuel film. The angle of inclination of the second component part is so selected that the cross section of the baffle receptacle expands in the direction of the inflow opening starting from the longitudinal axis. In this way, the situation is accounted for that, in the region of the inflow opening, the pressure wave, which exits from the intake channel, together with the entrained fuel droplets, has a velocity component at an angle to the longitudinal axis of the intake channel in the direction of the inflow opening. The second component part is inclined oppositely to the first component part. The second component part leads, in this way, to a low angle of incidence of the fuel droplets also in this region whereby a formation of a film of fuel is facilitated also near the inflow opening. The above-mentioned component parts of the baffle wall define an edge whereby a transition region is avoided wherein fuel droplets can impinge at an obtuse angle. The protective wall is so configured that, when viewed in plan toward the inflow opening, the second component part of the baffle wall is completely overlapped by the protective wall. A back-pulsating gas flow is deflected by the second component part in a direction toward the protective wall and from there, the gas flow is guided back to the intake opening of the intake channel. This can be advantageously supported by a corresponding flow-facilitating shape of the protective wall.

Analytic and empirical investigations have shown that the effect of the reflecting droplet formation or a film formation on the baffle wall is essentially dependent upon two dimensionless characteristic numbers, namely, the Reynolds number Re and the Laplace number La. The similarity characteristic quantity Re describes the ratio of the droplet velocity and the droplet diameter to the kinematic viscosity of the fuel. When fuel droplets impinge upon the baffle wall, the velocity component, which is perpendicular to the baffle wall surface, is significant. This velocity component is a function of the angle of impingement. The Reynolds number too is, accordingly, a function of the angle of inclination of the baffle wall. The similarity characteristic quantity La describes the inherent characteristics of the fuel droplet in that its diameter as well as its surface tension and substance density are set in relationship to the square of the fuel viscosity. More detailed investigations have shown that a film formation on the baffle wall occurs when the Reynolds number is:

$$Re \leq 24 \times La^{0.419}.$$

To adjust an adequately small Reynolds number for gasoline as fuel, an inclination angle of the baffle wall (that is, of its two component parts) of $\leq 70°$ has been shown to be suitable whereby a desired film formation is ensured.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
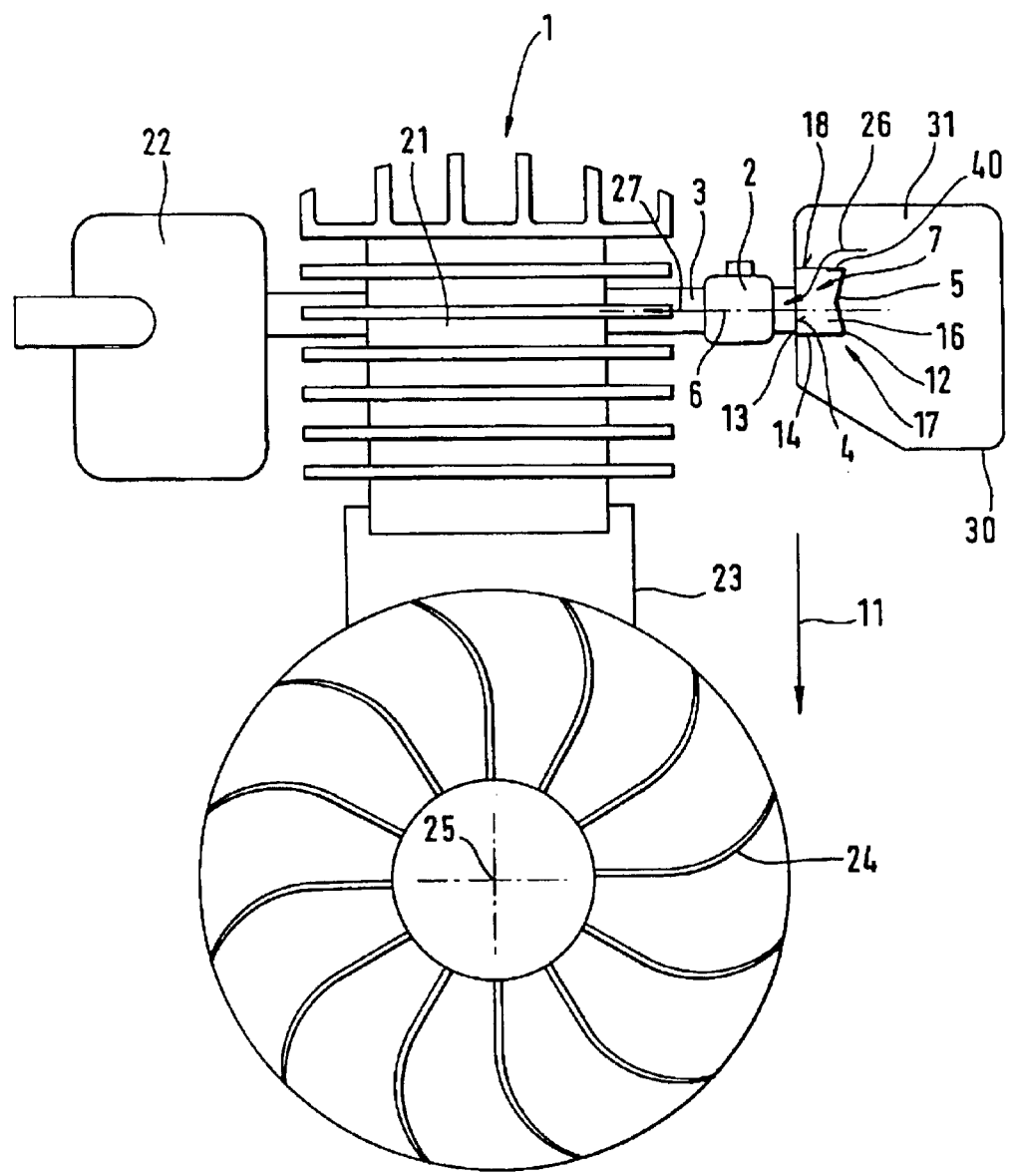
FIG. 1 is a schematic overview diagram of an internal combustion engine having a carburetor and a baffle receptacle mounted ahead of the carburetor.

FIG. 1 shows an internal combustion engine 1 in the form of a single-cylinder two-stroke engine as a drive motor for a work apparatus not shown in greater detail. A cylinder 21 is arranged on an engine housing 23 and a piston is disposed in the cylinder 21 and drives a crankshaft having a fan wheel 24 about a crankshaft axis 25 via a connecting rod. An exhaust-gas muffler 22 is provided laterally of the cylinder 21. An intake channel 3 is provided on the side of the cylinder 21 which lies opposite the exhaust-gas muffler 22. A carburetor 2 for forming an air/fuel mixture is connected via the intake channel 3. The intake channel 3 opens on the side of the carburetor 2 facing away from the engine 1 with an intake opening 4 into the interior space 31 of an air filter housing 30. A baffle receptacle 17 is provided in the interior space 31 and has a baffle wall 5 lying transversely to the longitudinal axis 6 of the intake channel 3 and is mounted at a spacing ahead of the intake opening 4. The baffle wall 5 lies in a plane (FIG. 2) approximately parallel to the plane 35 of the intake opening 4.

The direction of the gravity force is indicated by arrow 11. Referred to the gravity force direction 11, the engine 1 is shown in its usual operating position wherein the work apparatus, which is driven thereby, is held or guided, for example, at a handle. The lower edges (12, 13) are each referred to the gravity force direction 11. The edge 12 of the baffle wall 5 and the lower edge 13 of the intake opening 4 are connected to each other by the end wall 14. It can also be practical to provide, for example, a fuel collecting device in lieu of the end wall 14 for a return of fuel into the fuel tank. A baffle receptacle 17 is formed from the baffle wall 5 and the end wall 14 together with additional side walls 16 shown in FIG. 2. The baffle receptacle 17 has an inflow opening 18 on its side lying opposite the end wall 14. The inflow opening 18 lies rotated by approximately 90° to the intake opening 4. The engine 1 draws combustion air via the intake channel 3 in the direction of arrow 27. The combustion air is drawn from the inner space 31 of the air filter housing 30 in the direction of arrow 26 through the inflow opening 18 into a baffle enclosure 7 between the baffle wall 5 and the intake opening 4 and, from there, through the intake opening 4 into the intake channel 3.

Figure 2:
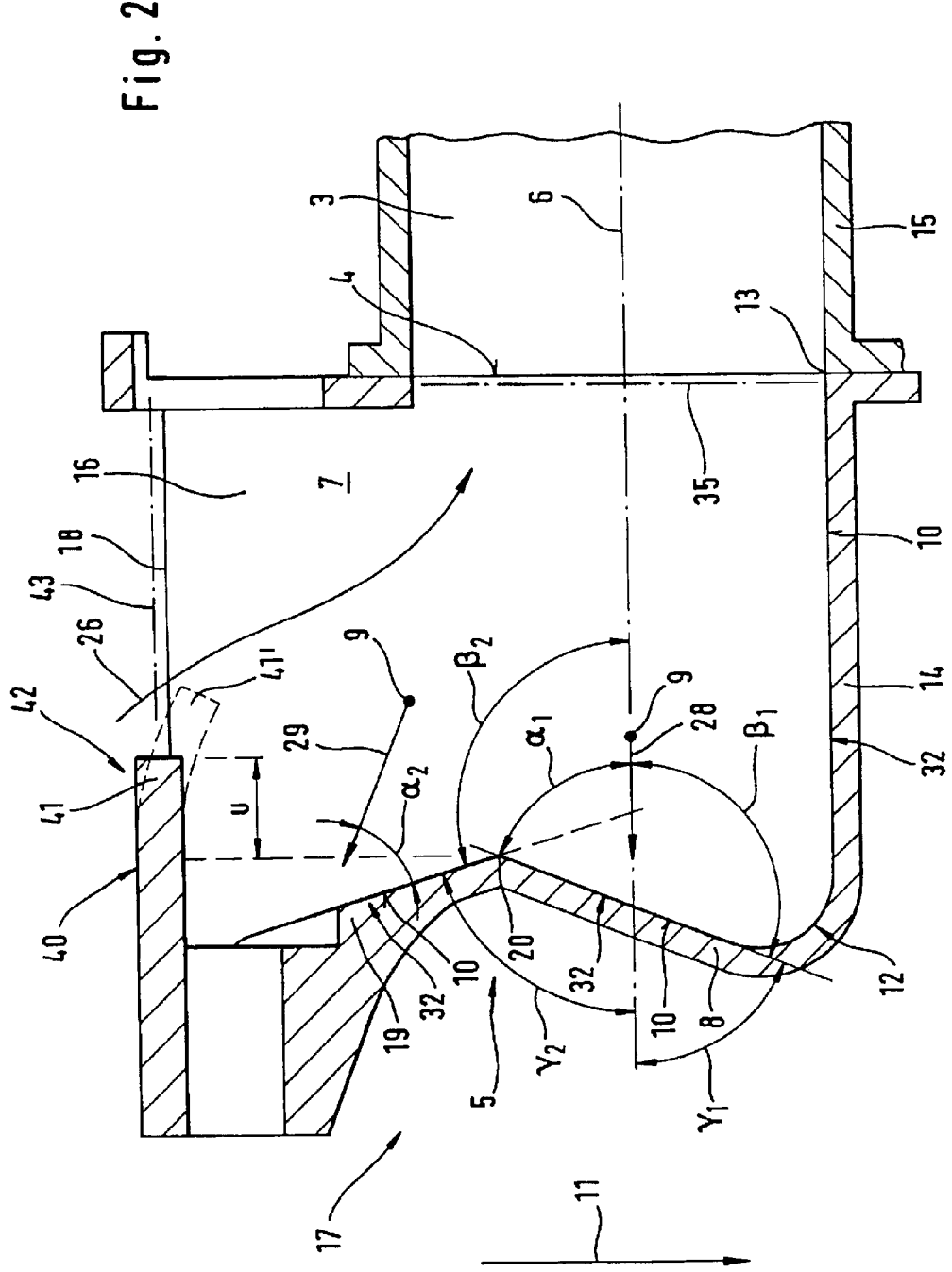
FIG. 2 shows details of the baffle receptacle in FIG. 1 in cross section.
Figure 3:
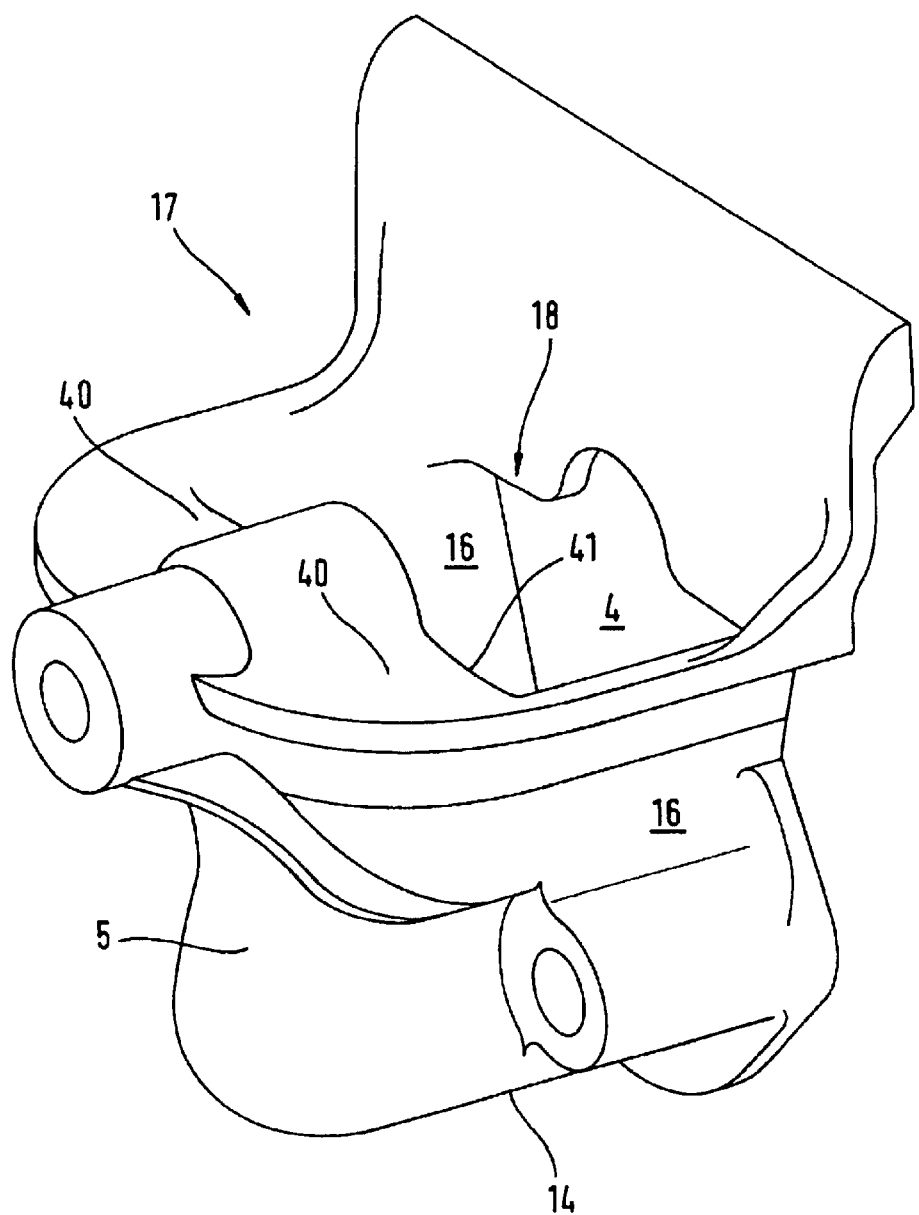
FIG. 3 is a perspective view showing the configuration of the baffle receptacle having the protective wall 40.

FIG. 2 shows details of the baffle receptacle 17 of FIG. 1. The baffle receptacle 17 is shown in FIG. 2 as a mirror image compared to FIG. 1. The baffle enclosure 7 is delimited by a baffle wall 5, an end wall 14 and two side walls 16. Because of the cross sectional view, only one of the two side walls 16 is shown. The baffle wall 5 is subdivided into a first component part 8 and a second component part 19, which join one another in the region of an edge 20 lying inside the baffle enclosure 7. Referred to the gravity force direction 11, the edge 20 lies above the longitudinal axis 6 of the intake channel 3 and is closer to the plane 35 of the intake opening 4 than the foot section of the component part 8 of the baffle wall 5 which joins to the end wall 14. The two component parts (8, 19) are inclined at respective inclination angles ($\gamma 1$, $\gamma 2$) referred to the longitudinal axis or at angles ($\beta 1$, $\beta 2$) which are complementary to respective inclination angles ($\gamma 1$, $\gamma 2$).

In the embodiment shown and in adaptation to the substance characteristics of gasoline, angle $\gamma 1$ is approximately 70° and angle $\gamma 2$ is approximately 60° and the corresponding complementary angles $\beta 1$ and $\beta 2$ therefore amount to approximately 110° and 120°, respectively. Depending upon the application, also a smaller angle of inclination ($\gamma 1$, $\gamma 2$) can be practical. The selection of another fuel having different substance characteristics, such as methanol, can lead to another angle of inclination ($\gamma 1$, $\gamma 2$) which effects the film formation.

Depending upon the application, a proportionately larger configuration of the first component part or of the second component part can be practical. Variations are also possible wherein the entire baffle wall 5 comprises a first component part 8 or a second component part 19 and these component parts (8, 19) are inclined by corresponding inclination angles ($\gamma 1$, $\gamma 2$) with respect to the longitudinal axis 6.

The inclination of the first component part 8 at the inclination angle $\gamma 1$ is so aligned that the cross section of the baffle enclosure 7 expands in the direction toward the end wall 14 starting from the longitudinal axis 6. The inclination of the second component part 19 is oppositely aligned by the inclination angle $\gamma 2$. Accordingly, the cross section of the baffle enclosure 7 widens measured from the longitudinal axis 6 starting from the edge 20 in the direction toward the inflow opening 18.

At the lower edge 12 of the baffle wall 5 (or the first component part 8 thereof), the baffle wall 5 extends rounded into the end wall 14. The transition between the baffle wall 5 and the side wall 16 and the transition between the end wall 14 and the side wall 16 are also configured so as to be rounded in the region of arrow 32. The end wall 14 extends in a straight line into the lower channel wall 15 in the region of the lower edge 13 of the intake opening 4. Another uniform transition, which avoids the steps, such as a curved transition, can also be practical.

An exemplary fuel droplet 9 moves approximately parallel to the longitudinal axis 6 of the intake channel 3 in the direction of arrow 28. From the inclination angle $\gamma 1$ of the first component part 8, there results, for the fuel droplet 9 shown, an impact angle $\alpha 1$ on the first component part 8, which is $\alpha 1 = \gamma 1 = 70°$ in the embodiment shown, and leads to the formation of a fuel film 10 on the first component part 8. A further fuel droplet 9 is shown in the region of the inflow opening 18 and this fuel droplet 9 moves in the direction of arrow 29. The arrow 29 has a component in the direction of the inflow opening 18. Because of the last-mentioned component, the angle of incidence $\alpha 2$ of this fuel droplet 9 on the second component part 19 is approximately 40° and is therefore less than $\gamma 2 = 60°$. The incidence angle $\alpha 2$ is smaller in comparison to the first incidence angle $\alpha 1$ and leads to an improved formation of the fuel film 10 on the second component part 19 to avoid droplet formation in the vicinity of the inflow opening 18.

A protective wall 40 is provided in order to prevent a carrying out of fuel droplets or partial droplets through the inflow opening 18 into the filter housing. The protective wall 40 is provided on the edge 42 of the inflow opening 18 facing away from the intake opening 4. As shown in FIG. 2, the protective wall 40 extends partially over the baffle enclosure 7. The protective wall lies essentially at a distance 43 from the plane of the inflow opening 18.

In order to reliably prevent a carrying away of the finest fuel droplets from the baffle enclosure 7, it is provided that the free end section 41 of the protective wall 40 lies closer to the plane 35 of the intake opening than the edge 20 of the inclined first component part 8 of the baffle wall 5. The edge 20 lies in the baffle enclosure 7. The length of the protective wall 40 is especially so provided that, in the plan view of the inflow opening 18, the protective wall 40 completely covers the second component part 19 of the baffle wall 5. In this way, it is ensured that also fuel droplets 9, which impinge upon the second component part 19 of the baffle wall 5, are not carried away as a fuel fog through the inflow opening 18 in the case of a bursting; rather, these fuel droplets deposit on the protective wall 40. Gas, which flows back from the intake channel 3, is deflected upwardly in the direction toward the protective wall 40 because of the inclined position of the second component part 19 and is deflected back from the protective wall 40 in the direction toward the intake opening 4. Here, it is advantageous when the free end section 41 of the protective wall 40 is bent over preferably into the baffle enclosure 7 in a direction toward the intake opening 4. An end section 41', which is bent over in this manner, can be configured also by a heaping of material in the region of the end section 41 and supports the back flow in the direction toward the intake opening 4.

It is understood that the foregoing description is that of the preferred embodiments of the invention and that various changes and modifications may be made thereto without departing from the spirit and scope of the invention as defined in the appended claims.

What is claimed is:

1. A carburetor arrangement for an internal combustion engine driving a work apparatus, the carburetor arrangement comprising:

a carburetor;

an intake channel defining a longitudinal axis and being formed in said carburetor and having an end facing away from said engine;

said intake channel having an intake opening at said end;

a baffle wall at least partially covering said intake opening;

said baffle wall being mounted transversely to said longitudinal axis and being disposed at a distance from said intake opening;

said baffle wall delimiting a baffle enclosure disposed between said baffle wall and said intake opening;

said baffle enclosure having an inflow opening for combustion air and said inflow opening lying rotated by approximately 90° to said intake opening;

said inflow opening having an edge lying away from said intake opening; and, a protective wall provided at said edge and said protective wall extending partially over said baffle enclosure.

2. The carburetor arrangement of claim 1, wherein said inflow opening defines a plane and said protective wall extends substantially in said plane.

3. The carburetor arrangement of claim 1, wherein said baffle wall has a first component part defining an edge facing toward said intake opening; said intake opening defines a plane; and, said protective wall has a free end section lying closer to said plane of said intake opening than said edge of said first component part of said baffle wall.

4. The carburetor arrangement of claim 1, wherein said protective wall has a free end section bent over into said baffle enclosure in a direction toward said intake opening.

5. The carburetor arrangement of claim 1, wherein said baffle wall has at least a first component part inclined into said baffle enclosure at an angle ($\gamma1$) referred to said longitudinal axis.

6. The carburetor arrangement of claim 5, wherein said angle ($\gamma1$) is so selected that fuel droplets, which exit from said intake channel and impinge on said first component part, form a film of fuel.

7. The carburetor arrangement of claim 1, wherein said baffle wall has a lower edge and said intake channel has a lower edge at said intake opening; said work apparatus has a usual work position and said carburetor arrangement further comprises an end wall lying downwardly in said work position referred to a direction defined by gravity force; and, said end wall connects said lower edge of said baffle wall to said lower edge of said intake opening.

8. The carburetor arrangement of claim 7, wherein said baffle wall and said end wall extend one into the other over a rounded transition.

9. The carburetor arrangement of claim 7, wherein said end wall extends uniformly into a channel wall of said intake channel.

10. The carburetor arrangement of claim 9, wherein said end wall extends linearly into said intake channel.

11. The carburetor arrangement of claim 7, wherein said baffle enclosure includes two side walls; and, said side walls, said baffle wall and said end wall conjointly define said baffle enclosure having an inflow opening lying opposite said end wall.

12. The carburetor arrangement of claim 5, wherein said baffle wall has a second component part inclined at an inclination angle ($\gamma2$) with respect to said longitudinal axis which is so inclined that the cross section of said baffle enclosure expands from said longitudinal axis in a direction toward said inflow opening.

13. The carburetor arrangement of claim 12, wherein said first component part and said second component part define an edge facing toward said intake opening whereat said second component part joins said first component part.

14. The carburetor arrangement of claim 12, wherein the inclination angles ($\gamma1$, $\gamma2$) of each one of said first and second component parts are equal to or less than approximately 70°.

* * * * *